United States Patent [19]

Dolsen et al.

[11] Patent Number: 4,567,482
[45] Date of Patent: Jan. 28, 1986

[54] BYPASS CONTROL FOR STATIONS IN A COMMUNICATION SYSTEM

[75] Inventors: Philip C. Dolsen, Richmond Heights, Ohio; Satish Chandra, Springfield, Va.; Gordon R. Hammon; William J. Uren, both of Mentor, Ohio

[73] Assignee: The Babcock & Wilcox Company, New Orleans, La.

[21] Appl. No.: 440,910

[22] Filed: Nov. 12, 1982

[51] Int. Cl.$^4$ .......................... H04Q 9/00; H04J 3/02
[52] U.S. Cl. ................................ 340/825.05; 370/15
[58] Field of Search ...................... 340/825.02, 825.01, 340/825.05, 825.43; 370/15, 16

[56] References Cited

U.S. PATENT DOCUMENTS 3,458,661 7/1969 Forde et al. ........................ 370/15
4,159,470 6/1979 Strojny et al. ................. 340/825.05
4,374,436 2/1983 Armstrong ........................... 370/16
4,393,492 7/1983 Bishop .................................. 370/15

Primary Examiner—Donald J. Yusko
Attorney, Agent, or Firm—Vytas R. Matas; Robert J. Edwards

[57] ABSTRACT

A communication system wherein a plurality of remote stations are serially connected in a communication loop to a Control Station. Communication of intelligence to and from the remote stations and to and from the Control Station is by way of high frequency bits which are introduced serially and circulate through the loop. An inoperative remote station is bypassed by introducing into the station to be bypassed a D.C. signal of controlled magnitude, duration and polarity, which, through the required instrumentalities, disconnects the station from the communication loop while maintaining the integrity of the loop.

6 Claims, 2 Drawing Figures

BYPASS CONTROL FOR STATIONS IN A COMMUNICATION SYSTEM

This invention relates generally to a communication system wherein a plurality of remote stations, for receiving and transmitting intelligence, are serially connected in a chain or loop circuit. Intelligence is transmitted to and from the remote stations and to and from a Control Station by way of a series of bits which are introduced serially and circulated through the loop or along the chain for unidirectional or bidirectional transmission respectively. One such bidirectional system is illustrated and described in U.S. Pat. No. 3,898,373.

Communication systems wherein the remote stations are serially connected have the inherent fault that they become inoperative if any one of the remote stations becomes inoperative. It is to the elimination of this fault that this invention is primarily directed.

In accordance with this invention a particular one of the remote stations may be bypassed or unbypassed by means of a unique signal introduced into and transmitted over the communication circuit.

Further in accordance with this invention the bypassing or unbypassing of a remote station causes a minimum upset in the communication circuit.

Further in accordance with this invention there is incorporated in each remote station a manual control for bypassing or unbypassing the station.

Further in accordance with this invention failure of the power supply to a remote station effects automatic bypassing of the station.

Further in accordance with this invention the bypassing or unbypassing of a remote station does not require power to be available at the station.

These and other objectives of this invention will be apparent as the description proceeds in connection with the drawings in which:

IN THE DRAWINGS

DETAILED DESCRIPTION

Figure 1:
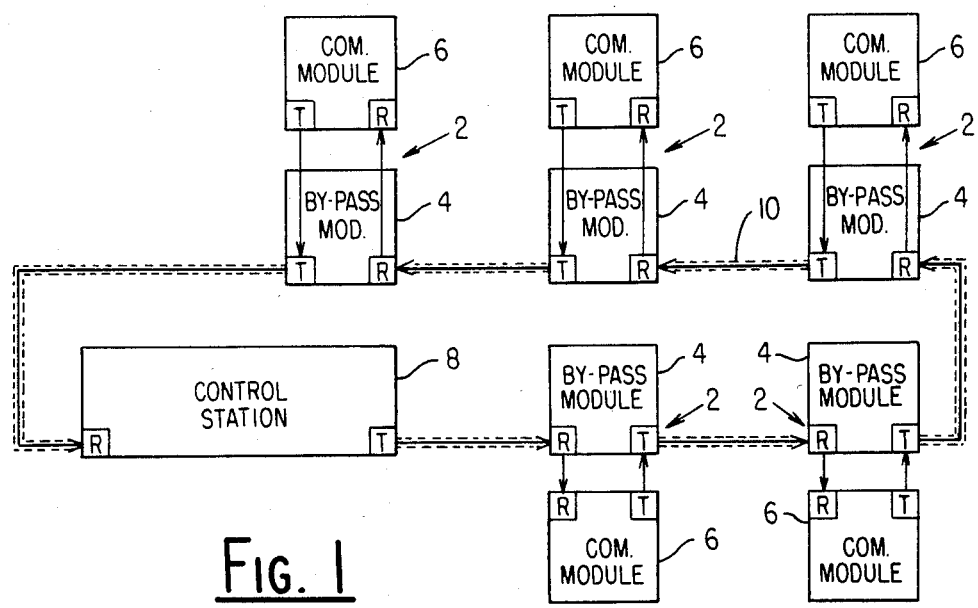
FIG. 1 is a block diagram illustrating, in general, the configuration of a communication system of the type to which this invention relates.

Referring to FIG. 1 there is shown a communication system comprised of a plurality of similar, but not necessarily identical, remote stations generally indicated at 2, each including a bypass module 4 and a communication module 6. As indicated each bypass module 4 is physically separated from its associated communication module 6 to facilitate protection of the communication module from high voltage surges along the communication circuit as might be caused, for example, by a lightning discharge, and from common-mode voltages which may be present in the circuit.

Communication between the remote stations 2 and a control station 8 may be, as shown, by way of a twisted, shielded, two-wire circuit, generally indicated at 10. It will be recognized, however, that there are other equally satisfactory means, such as coaxial cable, for coupling the stations.

For purposes of this invention, it is sufficient to state that the Control Station 8 and each remote communication module 6 includes the required apparatus to introduce serially bit-by-bit into the communication loop 10 commands, information etc. addressed to a particular one of the remote stations 2 or to the control station 8 each of which series of bits circulate through the communication loop in the direction shown by the arrows.

Figure 2:
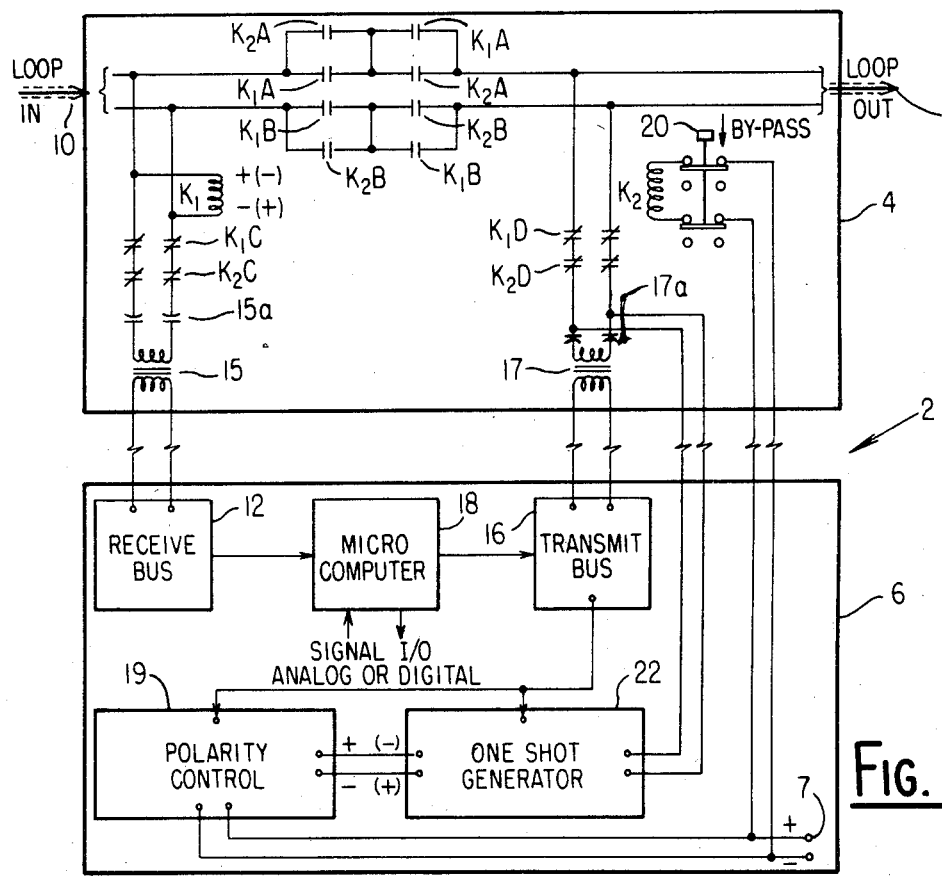
FIG. 2 is a block and schematic circuit diagram of a remote station.

As shown in FIG. 2, during normal operation, each series of bits generated in the Control Station 8 or in a remote station 2 circulating around the communication loop is shunted through all unbypassed communication modules 6 by virtue of the open contact pairs $K_1A$ and $K_1B$ of a polarity sensitive relay $K_1$ and the open contacts $K_2A$ and $K_2B$ of a solenoid relay $K_2$. Transmission of each series of bits from the bypass module 4 to the communication module 6 is by way of a blocking capacitor 15A and an isolation transformer 15. Transmission of each series of bits from the communication module 6 to the bypass module 4 is by way of an isolation transformer 17 and a blocking capacitor 17A. Transformers 15 and 17, while permitting passage of the high frequency bits, inhibit the passage of direct current into and out of the communication module 6. Blocking capacitors 15A and 17A inhibit the passage of direct current through the transformers 15 and 17 respectively.

Except for the communication module having an address corresponding to the address contained in a series of bits, all others act as repeater stations, the bits inputing into a receive bus 12, thence through a micro computer 18, transmit bus 16, to return to the communication loop 10. Direct current supplied terminals 7 from any suitable source (not shown) is available for use, as required, by any one of the components in the communication module 6 and bypass module 4.

As to the communication module 6, having an address corresponding to the address contained in a series of bits, the command or information signals also contained therein are transmitted to a mirco computer 18, of more or less power, depending upon the exigencies of a particular application. Thus the computer 18 may include an A/D converter for analog input signals, means for converting parallel digital signals into serial digital signals, required buffers, memories and the like.

From information received at the Control Station 8 from a remote station 2, or from other evidence available at the Control Station 8, it may be evident that a particular remote station 2 is out of order and should be bypassed. For other reasons also it may be desirable to temporarily or permanently bypass that remote station. This remote bypassing is accomplished by transmitting to the remote station first preceding the station to be bypassed a control signal causing the generation of a direct current signal of controlled magnitude, duration and polarity, which transmitted through the communication circuit effects bypassing of the remote station to be bypassed.

Assume, for example, it is the unbypassed remote station 2 next succeeding that shown in FIG. 2 which is to be bypassed. A control signal addressed to the station shown in FIG. 2 effects generation of the direct current signal of controlled magnitude, duration and forward polarity by means of a polarity control unit 19 and a one-shot generator 22 which is transmitted along the communication circuit 10 to the said next succeeding unbypassed station which is the station directed to be bypassed.

Assume now that it is the remote station shown in FIG. 2 which is to be bypassed. Upon reception of the direct current signal having a forward polarity, polarity sensitive solenoid $K_1$ is energized in a forward direction causing contact pairs $K_1A$; $K_1B$ to close and contact pairs $K_1C$; $K_1D$ to open. Isolation transformers 15 and 17 and blocking capacitors 15A and 17A inhibit the passage of the direct current signal to the module 6.

The now bypassed station 2 may be similarly unbypassed by a control signal from the Control Station 8 to the first preceding unbypassed remote station to generate a comparable direct signal but of reverse polarity which, upon reception at the station shown in FIG. 2 causes solenoid $K_1$ to be energized in reverse direction effecting opening of contact pairs $K_1A$, $K_1B$ and closure of contact pairs $K_1C$ and $K_1D$.

A remote station 2 may be locally bypassed by means of a double pole, single throw switch 20 located in bypass module 4. When manually moved to the open position solenoid $K_2$ is de-energized, causing contact pairs $K_2A$, $K_2B$ to close and contact pairs $K_2C$, $K_2D$ to open. Failure of the direct current supply to the station will similarly cause bypassing of the station by de-energizing the solenoid $K_2$.

We claim:

1. A communication system for transmitting intelligence by means of high frequency bits between a control station and a series of remote stations having the ability to remotely bypass selected remote stations comprising:

a communication loop having the control station and the remote stations serially connected therein;

each remote station having a bypass module physically separated from a communications module but electrically coupled thereto;

each communication module having means for generating a D.C. pulse of forward or reverse polarity in response to a control signal from the control station and transmitting said polarity signal to the bypass module of the next serially connected remote station;

each bypass module having means for electrically disconnecting and reconnecting its associated communication module from said communication loop while itself remaining in said loop responsive to said forward or reverse polarity signal from the communication module of the preceeding remote station.

2. In a communication system as set forth in claim 1 wherein said means for generating a D.C. pulse includes means for generating a D.C. pulse of controlled magnitude and duration.

3. In a communication system as set forth in claim 1 wherein each of said bypass modules includes a polarity sensitive relay which when energized by a D.C. pulse of forward polarity disconnects the associated communication module from the communication loop and substantially simultaneously closes a shunt in the communication loop around said particular remote station to thereby maintain the integrity of the communication loop while said particular remote station is bypassed and when energized by a D.C. pulse of reverse polarity reconnects the associated communication module in the communication loop and substantially simultaneously opens said shunt to thereby reactivate the remote station.

4. In a communication system as set forth in claim 3 wherein said communication module is electrically connected to said bypass module by an isolating transformer.

5. In a communication system as set forth in claim 4 each bypass module having a manual switch for electrically disconnecting the associated communication module.

6. In a communication system as set forth in claim 5 each bypass module having an energized coil which electrically disconnects the associated communication module whenever power is removed from said coil.

* * * * *